United States Patent
Sucan

(10) Patent No.: US 10,782,685 B1
(45) Date of Patent: Sep. 22, 2020

(54) PLANNER SYSTEM RECOVERY FOR AUTONOMOUS VEHICLES

(71) Applicant: Waymo LLC, Mountain View, CA (US)

(72) Inventor: Ioan-Alexandru Sucan, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 33 days.

(21) Appl. No.: 16/163,119

(22) Filed: Oct. 17, 2018

Related U.S. Application Data

(60) Provisional application No. 62/743,645, filed on Oct. 10, 2018.

(51) Int. Cl.
| | |
|---|---|
| *G05D 1/00* | (2006.01) |
| *G05D 1/02* | (2020.01) |
| *B60W 50/02* | (2012.01) |
| *B60W 50/029* | (2012.01) |
| *B60W 50/023* | (2012.01) |

(52) U.S. Cl.
CPC ......... *G05D 1/0077* (2013.01); *B60W 50/023* (2013.01); *B60W 50/029* (2013.01); *G05D 1/0088* (2013.01); *G05D 1/0212* (2013.01); *B60W 2050/0292* (2013.01); *G05D 2201/0213* (2013.01)

(58) Field of Classification Search
CPC .. G05D 1/0077; G05D 1/0212; G05D 1/0088; G05D 2201/0213; B60W 50/023; B60W 50/029; B60W 2050/0292
See application file for complete search history.

(56) References Cited

U.S. PATENT DOCUMENTS

| | | | |
|---|---|---|---|
| 9,551,992 B1 | 1/2017 | Barton-Sweeney et al. | |
| 2015/0149073 A1 | 5/2015 | Ishigami et al. | |
| 2017/0318732 A1* | 11/2017 | Yamashita | G01C 21/26 |
| 2018/0050704 A1 | 2/2018 | Tascione et al. | |

FOREIGN PATENT DOCUMENTS

WO      2016016533 A1    2/2016

* cited by examiner

*Primary Examiner* — Rodney A Butler
(74) *Attorney, Agent, or Firm* — Botos Churchill IP Law

(57) ABSTRACT

Aspects of the disclosure relate to controlling a vehicle in an autonomous driving mode using trajectories. For instance, a trajectory may be received by one or more first computing devices from one or more second computing devices. While the first computing devices are controlling the vehicle in the autonomous driving mode based on the trajectory, an error may be generated by second computing devices. Whether the error is a recoverable error may be determined, and if so, the second computing devices attempt to generate a new trajectory. When the second computing devices generate the new trajectory, the vehicle may be controlled by the first computing devices according to the new trajectory.

20 Claims, 8 Drawing Sheets

PLANNER SYSTEM RECOVERY FOR AUTONOMOUS VEHICLES

CROSS-REFERENCE TO RELATED APPLICATIONS

The present application claims the benefit of the filing date of U.S. Provisional Patent Application No. 62/743,645 filed Oct. 10, 2018, the disclosure of which is hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and the vehicle maneuvers itself to that location. While doing so, safety of passengers, cargo, and the vehicle is an important consideration. Accordingly, often these vehicles have fallback systems which essentially cause the vehicle to apply the brakes as hard and as quickly as possible in an emergency.

BRIEF SUMMARY

Aspects of the disclosure provide a method of controlling a vehicle in an autonomous driving mode using trajectories. The method includes receiving, by one or more first computing devices, a trajectory from one or more second computing devices of the planner system; while the one or more first computing devices are controlling a vehicle in the autonomous driving mode based on the trajectory: generating, by the one or more second computing devices, an error, determining, by the one or more second computing devices, whether the error is a recoverable error, and when the error is determined to be a recoverable error, attempting, by the one or more second computing devices, to generate a new trajectory; and when the one or more second computing devices generate the new trajectory, controlling, by the one or more first computing devices, the vehicle according to the new trajectory.

In one example, determining whether the error is a recoverable error includes looking up a type of the error in an error list identifying recoverable errors. In another example, determining whether the error is a recoverable error includes looking up a type of the error in an error list identifying recoverable errors. In another example, the method also includes using a timer to limit an amount of time that the one or more second computing devices has to generate the new trajectory, such that when the timer expires before the new trajectory is generated, shutting down the planner system. In another example, the method also includes, after controlling the vehicle according to the new trajectory: generating, by the one or more second computing devices, a second error; determining, by the one or more second computing devices, whether the one or more second computing devices has met a maximum count of errors based on the first error and the second error; and controlling the vehicle according to the determination of whether the planner system has met the maximum count of errors. In this example, when the one or more second computing devices has met the maximum count of errors, controlling the vehicle according to the determination of whether the planner system has met the maximum count of errors includes controlling the vehicle in order to pull over the vehicle within a predetermined period of time. In addition or alternatively, determining whether the one or more second computing devices has met the maximum count of errors includes determining whether the one or more second computing devices has met the maximum count of errors over a predetermined period of time. In addition or alternatively, determining whether the one or more second computing devices has met the maximum count of errors includes determining whether the one or more second computing devices has met the maximum count of errors over a trip from an initial location to a destination. In addition or alternatively, determining whether the one or more second computing devices has met the maximum count of errors includes determining whether the one or more second computing devices has met the maximum count of errors for a given type of error. In addition or alternatively, determining whether the one or more second computing devices has met the maximum count of errors includes determining whether the one or more second computing devices has met the maximum count of errors for all types of errors generated by the one or more second computing devices. In another example, the method also includes, after controlling the vehicle according to the new trajectory: generating, by the one or more second computing devices, a second error; determining, by the one or more second computing devices, whether the one or more second computing devices has met a maximum cumulative amount of recovery time attempting to recover from errors during a given trip; and controlling the vehicle according to the determination of whether the one or more second computing devices has met the maximum cumulative amount of recovery time. In this example, wherein when the one or more second computing devices has met the maximum count of errors, controlling, by the one or more first computing devices, the vehicle in order to pull over the vehicle within a predetermined period of time. In addition or alternatively, determining whether the one or more second computing devices has met the maximum count of errors includes determining whether the one or more second computing devices has met the maximum cumulative amount of recovery time over a predetermined period of time.

Another aspect of the disclosure provides a method of controlling a vehicle in an autonomous driving mode using trajectories. The method includes receiving, by one or more first computing devices, a trajectory from one or more second computing devices of the planner system; while the one or more first computing devices are controlling a vehicle in the autonomous driving mode based on the trajectory: generating, by the one or more second computing devices, an error, determining, by the one or more second computing devices, whether the error is a recoverable error, and when the error is determined not to be a recoverable error, shutting the one or more second computing devices down and controlling, by the one or more first computing devices, the vehicle according to a last received trajectory.

In this example, when the error is not included in the error list, using a default rule to determine that the error is a non-recoverable error. In another example, controlling the vehicle according to the last received trajectory includes following a second portion of the last received trajectory in order to stop the vehicle.

A further aspect of the disclosure provides a system for controlling a vehicle in an autonomous driving mode using trajectories. The system includes one or more first computing devices configured to: receive a trajectory from one or more second computing devices; and control the vehicle in the autonomous driving mode based on the trajectory, and when one or more second computing devices generates a new trajectory, control, by the one or more first computing devices, the vehicle according to the new trajectory; and one or more second computing devices configured to, while the one or more first computing devices is controlling the vehicle in the autonomous driving mode based on the trajectory: generate an error, determine, by the one or more second computing devices, whether the error is a recoverable error, and when the error is determined to be a recoverable error, attempting to generate the new trajectory.

In one example, the system also includes the vehicle. In another example, the one or more second computing devices are further configured to determine whether the error is a recoverable error by looking up a type of the error in an error list identifying recoverable errors. In another example, the one or more second computing devices are further configured to, generate a second error and determine whether the one or more second computing devices has met a maximum count of errors based on the first error and the second error. In/this example, the one or more second computing devices are further configured to stop attempting to generate new trajectories when the second computing devices are determined to have met the maximum count of errors.

DETAILED DESCRIPTION

Overview

Figure 1:
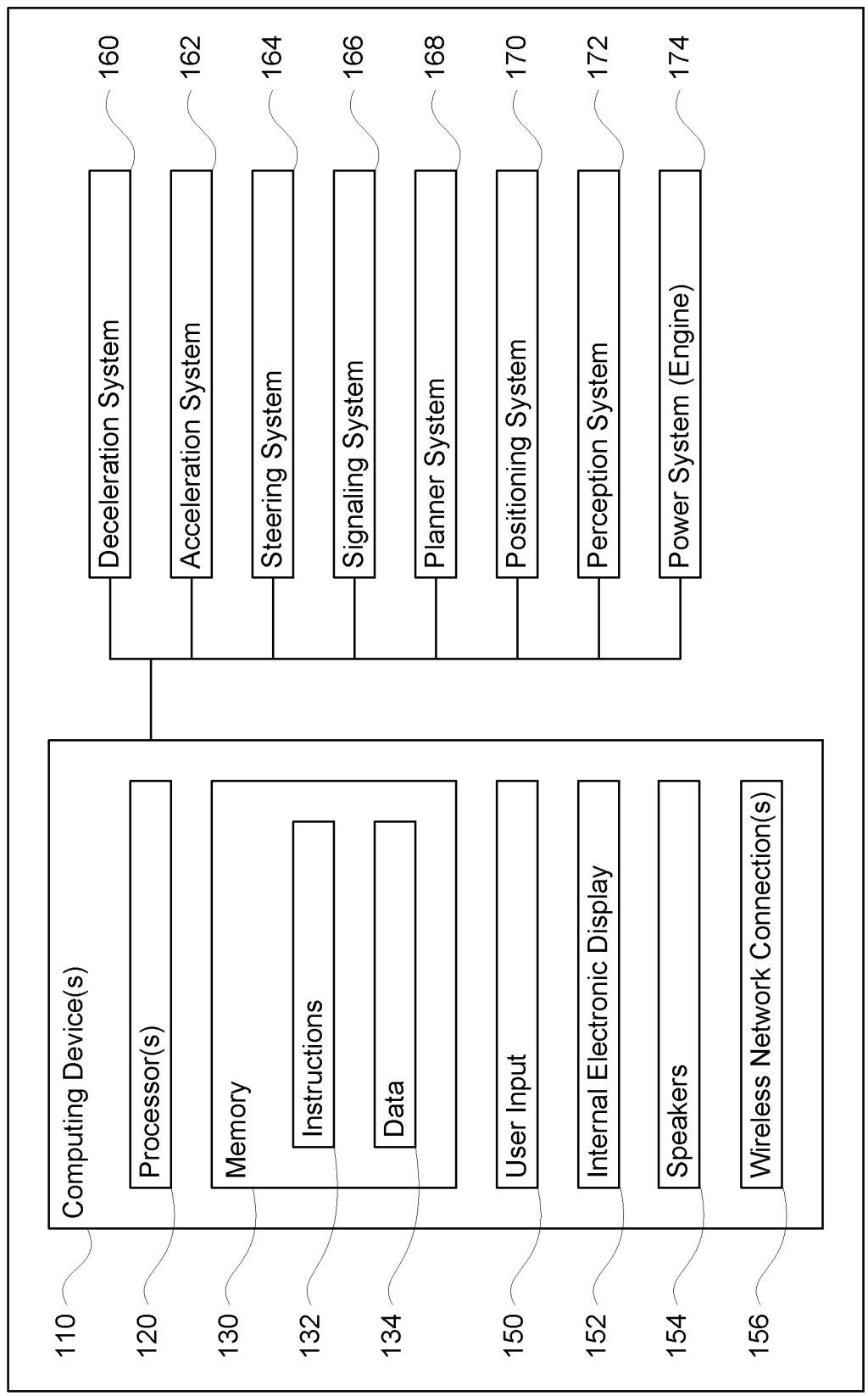
FIG. 1 is a functional diagram of an example vehicle in accordance with an exemplary embodiment.

The technology relates to planner systems for planning future trajectories for autonomous vehicles. A planner system of an autonomous vehicle may generate a trajectory and send it to another computing system in order to control the vehicle according to that trajectory. The trajectory includes at least some portion that allows the vehicle to proceed towards its end goal or destination, and thereafter, the trajectory provides fallback instructions for the vehicle to safely pull over, stop, etc. such that if a new trajectory is not received in time, the vehicle can safely pull over. In some instances, the planner system may generate errors which would cause the planner system to stop generating trajectories. Oftentimes, the planner system may actually be able to recover due to the transient nature of some types of errors, but the vehicle would still pull over, stop, etc. As a result, the vehicle may become stranded even for recoverable errors. To avoid this, in certain circumstances, the planner system may be given a "second chance" to generate a trajectory and recover from an error. If the planner system is able to do so within a predetermined period of time, the planner system may continue to provide the other computing system with new trajectories.

In order to allow this type of recovery, the vehicle's computing devices may have an access to a recoverable error list. If the planner system returns an error and, for instance, is unable to generate a trajectory, the vehicle's computing devices may determine whether the error is included on the recoverable error list. If not, the planner system may be shut down as a default for unidentified errors or errors identified as not recoverable on the recoverable error list. If the error is recoverable, the planner system may attempt to generate a new trajectory. The moment the planner system is successful generating a new trajectory, this new trajectory may be used to control the vehicle.

However, in order to avoid the planner system generating a new trajectory in circumstances where there is some other problem with the planner system, limits may be placed on the planner system's ability to recover. If any of these limits are met, the vehicle may be controlled in order to pull over to a safe location within some predetermined period of time.

The features described herein may allow the vehicle to respond to certain types of issues with the vehicle's systems "gracefully" rather than attempting to stop the vehicle immediately and/or stranding the vehicle, for example, when the vehicle's computing devices are overheating. The vehicle may be driven without a new trajectory for some brief period of time after an error because the second portion of a trajectory (i.e., a prior, valid trajectory), which provides a fallback solution (i.e. stop or pull over), can ensure the safety of the vehicle while providing the planner system with the ability to attempt to recover from the error. In this regard, the vehicle is able to attempt for a better outcome after an error while still preparing to stop the vehicle safely. As such, if the planner system is unable to recover, the vehicle is already stopped or on its way to stopping safely.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle in order to control the vehicle in an autonomous driving mode. For example, returning to FIG. 1, computing device 110 may be in communication with various systems of vehicle 100, such as deceleration system 160, acceleration system 162, steering system 164, signaling system 166, planner system 168, positioning system 170, perception system 172, and power system 174 in order to control the movement, speed, etc. of vehicle 100 in accordance with the instructions 134 of memory 130 in the autonomous driving mode. Again, although these systems are shown as external to computing device 110, in actuality, these systems may also be incorporated into computing device 110, again as an autonomous driving computing system for controlling vehicle 100. In addition, each of these systems may include one or more computing devices having processors and memory configured the same or similarly to computing devices 110, processors 120 and memory 130. For instance, referring to FIG. 6, planner system 168 includes one or more computing devices 610 having processors and memory storing data and instructions to enable the planner system to perform the operations and features described herein.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Planner system 168 may be used by computing device 110 in order to determine and follow a route to a location. In this regard, the planner system 168 and/or data 132 may store detailed map information, e.g., highly detailed maps identifying the shape and elevation of roadways, lane lines, intersections, crosswalks, speed limits, traffic signals, buildings, signs, real time traffic information, pull over spots vegetation, or other such objects and information. As discussed further below, these pull over spots may be "hand" selected or identified areas where at which the vehicle is lawfully able to stop and park for some period of time such as shoulder areas, parking spots, parking lots, emergency pull over spots, etc.

Figure 2:
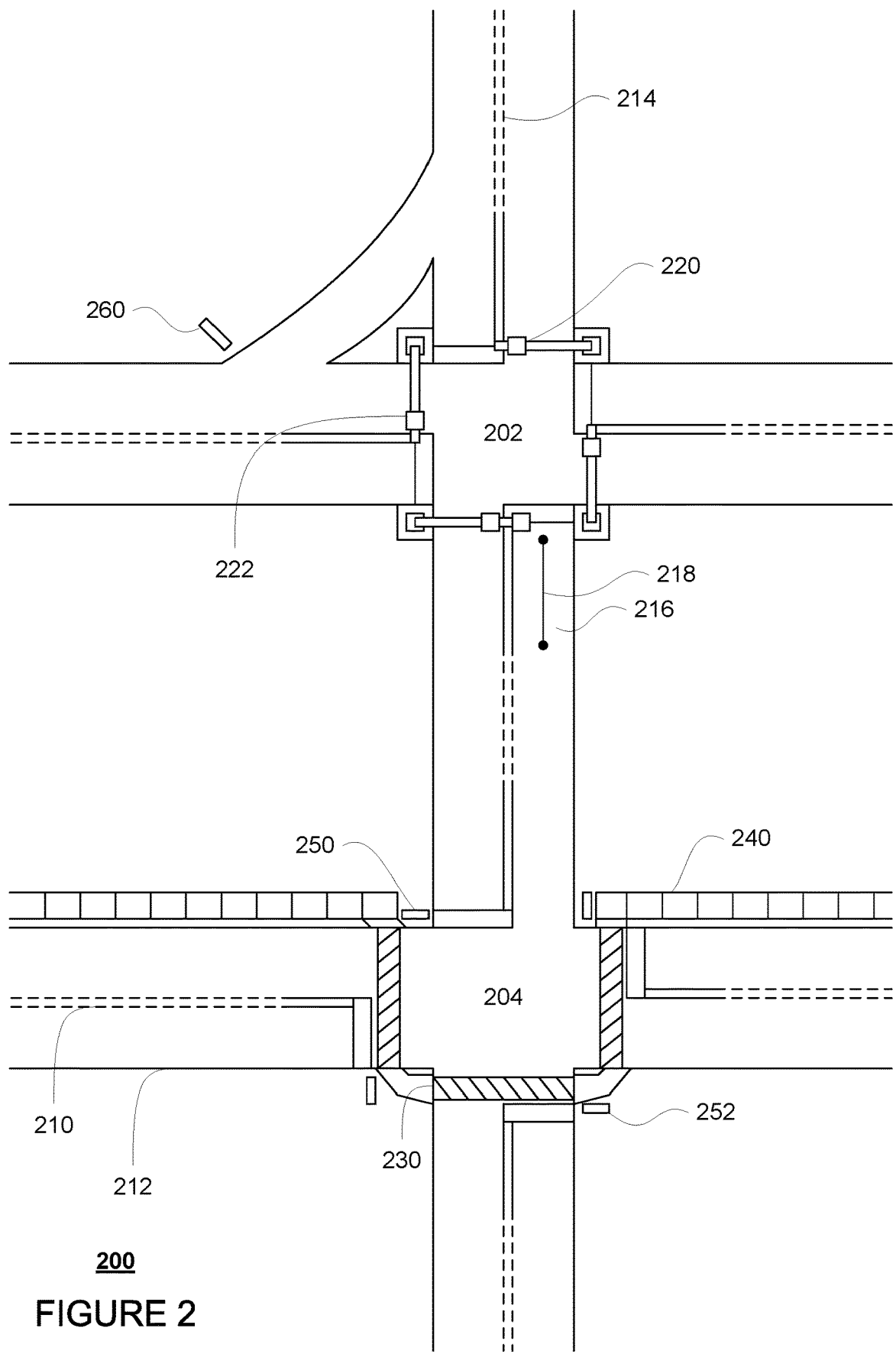
FIG. 2 is an example of map information in accordance with aspects of the disclosure.

FIG. 2 is an example of map information 200 for a section of roadway including intersections 202 and 204. The map information 200 may be a local version of the map information stored in the memory 130 of the computing devices 110. Other versions of the map information may also be stored in the storage system 450 discussed further below. In this example, the map information 200 includes information identifying the shape, location, and other characteristics of lane lines 210, 212, 214, traffic lights 220, 222, crosswalk 230, sidewalks 240, stop signs 250, 252, and yield sign 260. In this regard, the map information includes the three-dimensional (3D) locations of traffic lights 220, 222 as well as information identifying the lanes which are controlled by these traffic lights. For instance, traffic light 220 may be controlled by lane 216 corresponding to a road segment 218. For clarity and simplicity, only road segment 218 is depicted, though map information 200 may include road segments for all of the drivable areas of the map information. In other words, the map information is depicted herein as an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
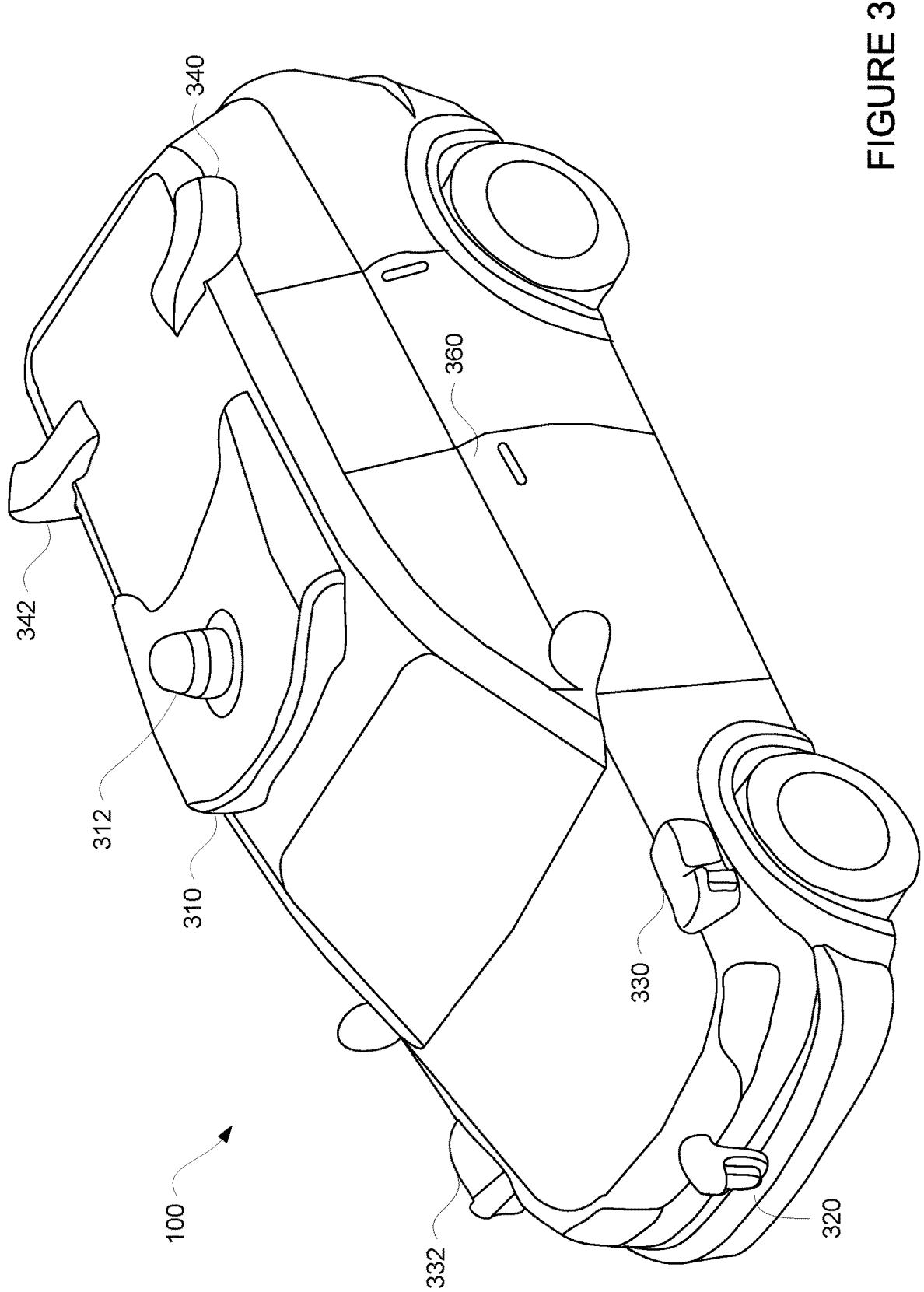
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

In one example, computing devices 110 may be control computing devices of an autonomous driving computing system or incorporated into vehicle 100. The autonomous driving computing system may capable of communicating with various components of the vehicle in order to control the movement of vehicle 100 according to primary vehicle control code of memory 130. For example, returning to FIG. 1, computing devices 110 may be in communication with various systems of vehicle 100, such as deceleration system 160, acceleration system 162, steering system 164, signaling system 166, planner system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planner system software module of the planner system 168. The planning system may use this input to generate a route and trajectories for the vehicle to follow for some brief period of time into the future. A control system software module of the computing devices 110 may be configured to control movement of the vehicle, for instance by controlling braking, acceleration and steering of the vehicle, in order to follow a trajectory received from the planner system 168.

The computing device 110 may control the vehicle by controlling various components. For instance, by way of example, computing device 110 may navigate the vehicle to a destination location completely autonomously using data from the detailed map information and planner system 168. In this regard, the planner system 168 may use the positioning system 170 to determine the vehicle's location and perception system 172 to detect and respond to objects when needed to reach the location safely. Again, in order to do so, computing devices 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

Figure 4:
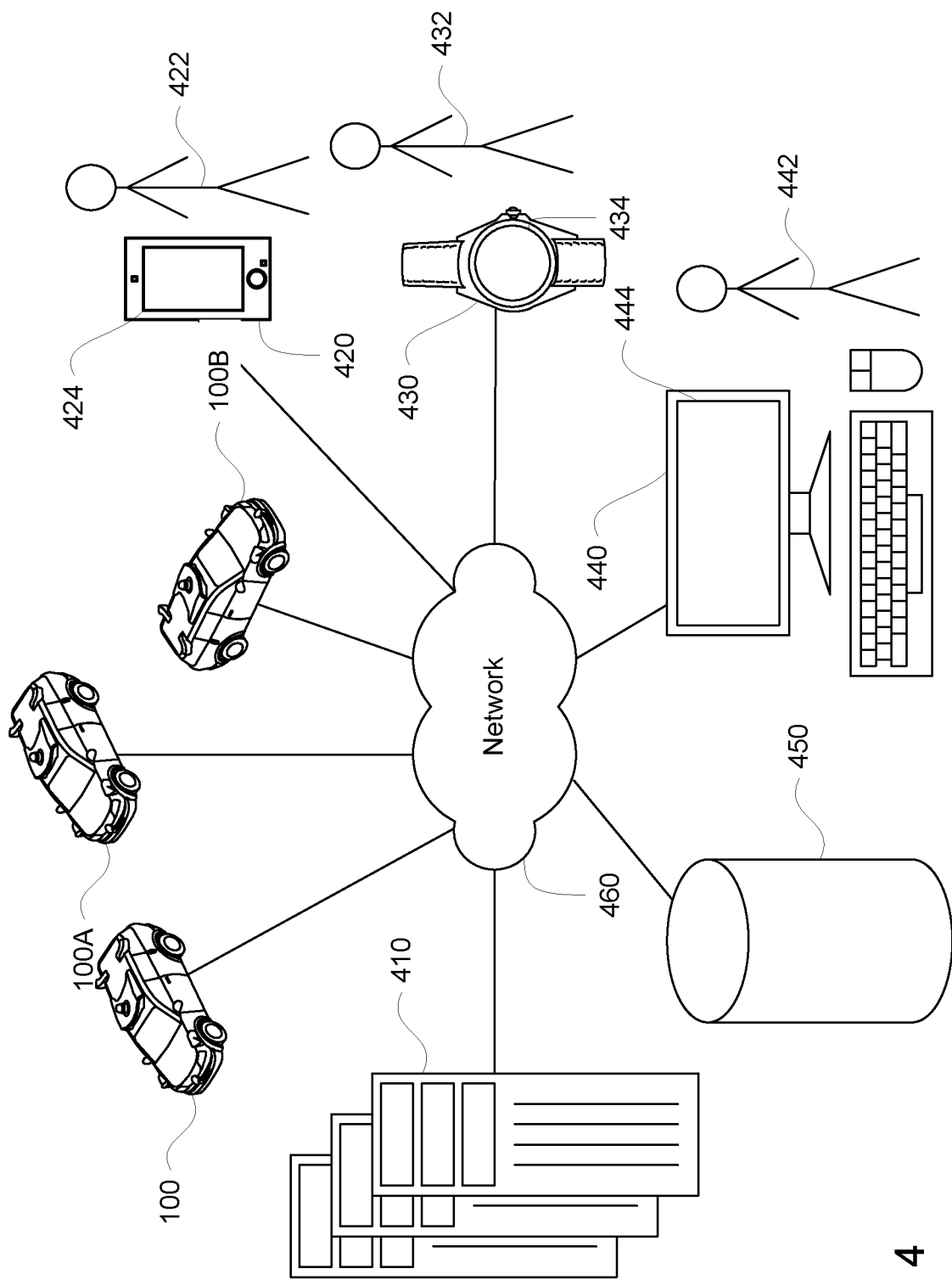
FIG. 4 is a functional diagram of an example system in accordance with aspects of the disclosure.
Figure 5:
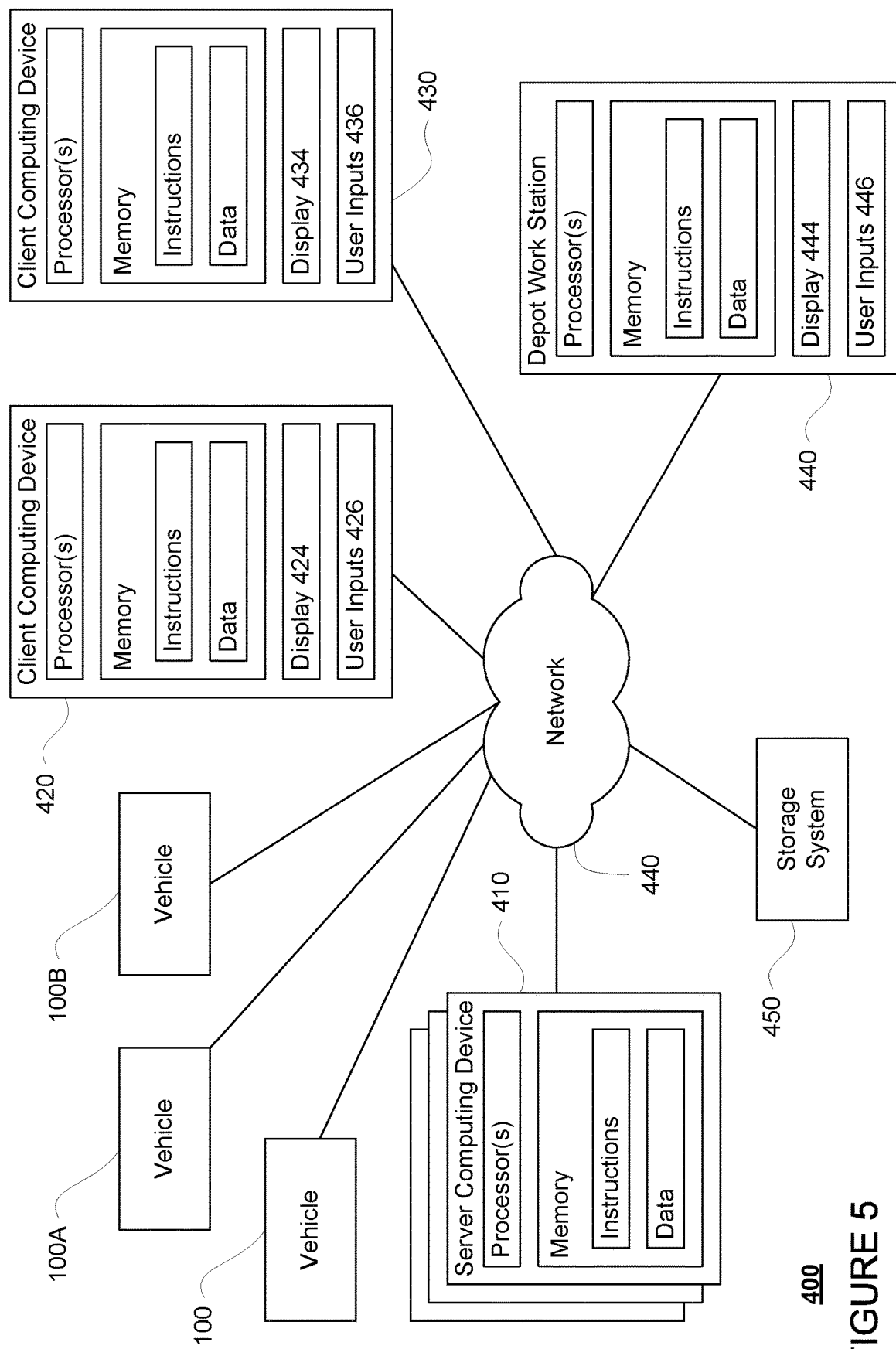
FIG. 5 is a pictorial diagram of the system of FIG. 2 in accordance with aspects of the disclosure.

The computing systems of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing systems of vehicle 100 or a similar computing device of vehicle 100A, 100B as well as computing devices 420, 430, 440 via the network 460. For example, vehicles 100, 100A, 100B may be a part of a fleet of vehicles that can send and receive information from the server computing devices 410. In addition, the server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 440 may be a concierge workstation used by an administrator or operator to communicate with passengers as discussed further below. Although only a single concierge workstation 440 is shown in FIGS. 4 and 5, any number of such work stations may be included in a typical system. Moreover, although operations work station is depicted as a desktop computer, operations works stations may include various types of personal computing devices such as laptops, netbooks, tablet computers, etc.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
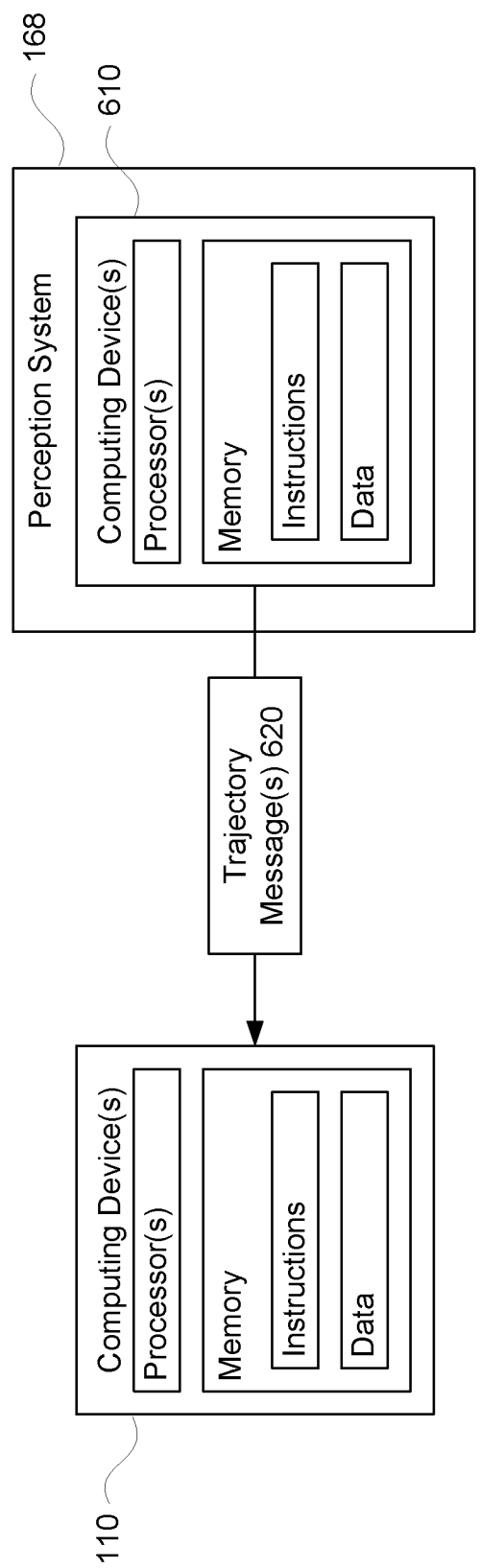
FIG. 6 is an example representation of computing systems and messages in accordance with aspects of the disclosure.

As noted above, in order to control vehicle 100 in the autonomous driving mode, the computing devices 110 and the computing devices of the planner system 168 may send and receive different types of messages and information with one another. This information may be sent, for instance, via a CAN bus of the vehicle. Referring to FIG. 6, the computing devices 610 of the planner system 168 may send trajectory messages 620 including trajectories to the computing devices 110. The computing devices 110 may receive these messages and control the vehicle according to the received trajectories. The arrow represents the direction of the flow of these messages. As noted above, the computing devices 610 may include processors and memory configured the same or similarly to computing devices 110, processors 120 and memory 130.

The computing devices 610 of the planner system 168 may use various inputs to generate new trajectories for the vehicle. These inputs may include detected objects, predicted future behaviors, various likelihoods from detection system software modules, the map information identifying the vehicle's environment, position information from the positioning system identifying the location and orientation of the vehicle, and a destination for the vehicle as well as feedback from various other systems of the vehicle. These trajectories may be generated periodically, for instance, 10 times per second or more or less, and may extend for some time and distance into the future in order to allow the vehicle follow the route to the destination. These trajectories may be generated as "desired paths" in order to avoid obstacles, obey laws and generally drive safely and effectively. Each trajectory may define various requirements for the vehicle's acceleration, speed, and position at different times along the trajectory. Each trajectories may include a first portion designed to cause the vehicle to reach a destination or end goal and a second portion designed to allow the vehicle to pull over or stop safely. In this regard, if a new trajectory is not received in time, the vehicle can safely pull over by following the second portion of the trajectory.

Figure 7:
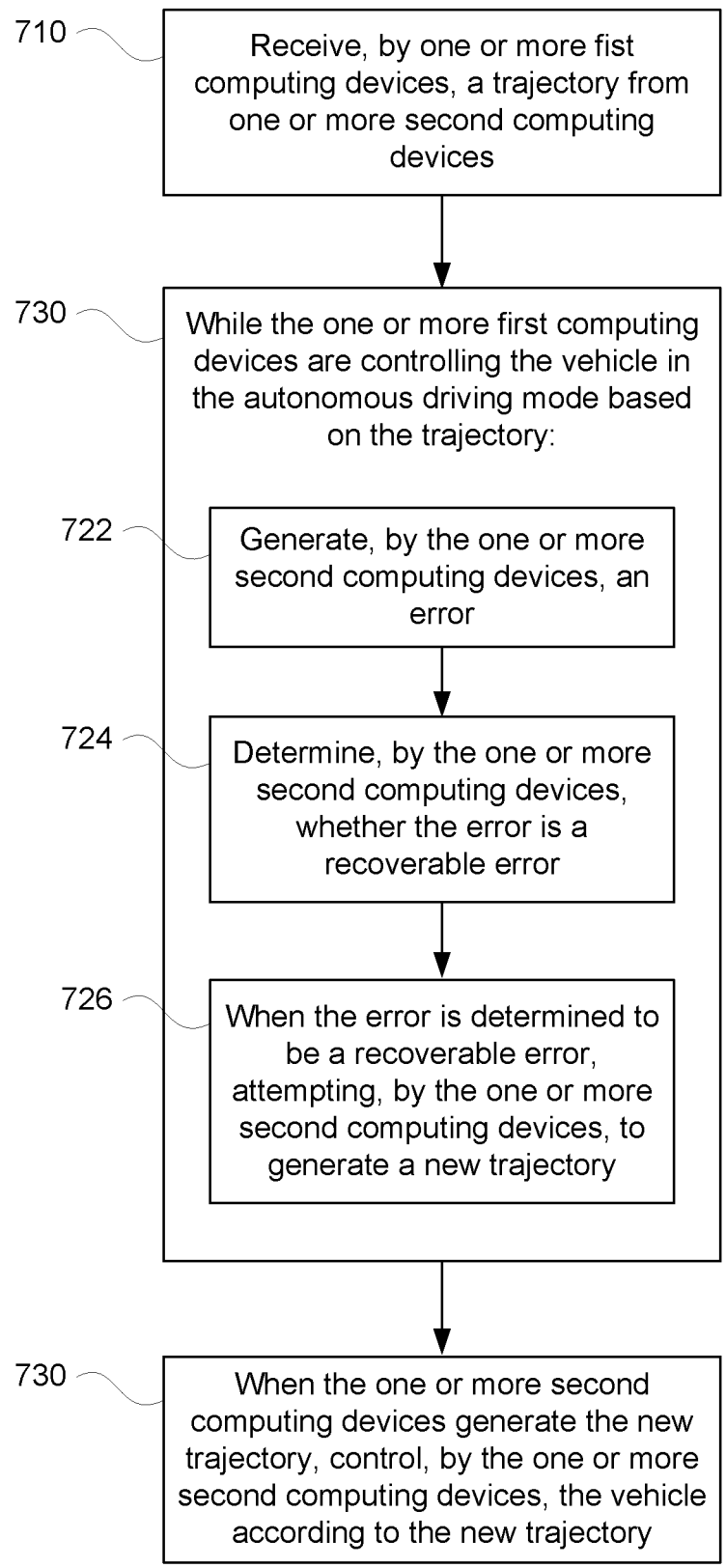
FIG. 7 is an example flow diagram in accordance with aspects of the disclosure.

These trajectories may be sent to and received by the computing devices 110, for instance, via a trajectory messages 620 of FIG. 6. FIG. 7 is an example flow diagram 700 for controlling a vehicle, such as vehicle 100, in an autonomous driving mode using trajectories generated by a planner system including one or more first computing devices, such as planner system 168 and computing devices 610. Referring to block 710, a trajectory is received by the computing devices 110, for instance, from the computing devices 610.

Figure 8:
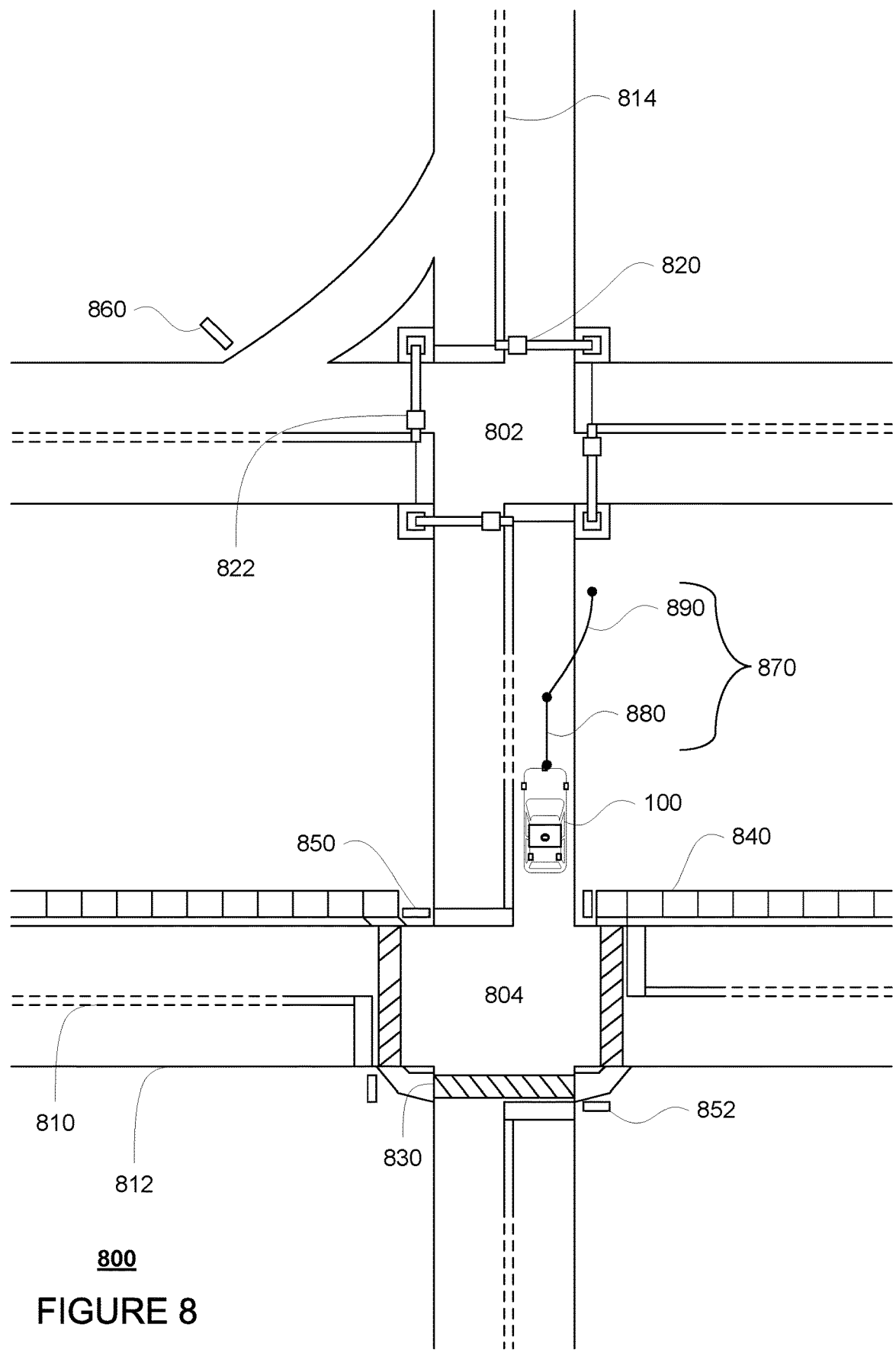
FIG. 8 is an example bird's eye view of a geographic area in accordance with aspects of the disclosure.

In response, the computing devices 110 may control the vehicle in the autonomous driving mode according to the received trajectory, now a "current" trajectory, as shown in block 720 of FIG. 7, by controlling various systems of the vehicle as discussed above. FIG. 8 depicts vehicles 100 being maneuvered on a section of roadway 800 including intersections 802 and 804. In example of FIG. 8, intersections 802 and 804 correspond to intersections 202 and 204 of the map information 200, respectively. In this example, lane lines 810, 812, and 814 correspond to the shape, location, and other characteristics of lane lines 210, 212, and 214, respectively. Similarly, crosswalk 830 corresponds to the shape, location, and other characteristics of crosswalk 230, respectively; sidewalks 840 correspond to sidewalks 240; traffic lights 820, 822 correspond to traffic lights 220, 222, respectively; stop signs 850, 852 correspond to stop signs 250, 252, respectively; and yield sign 860 corresponds to yield sign 260. Vehicle 100 is approaching intersection 804 and following a trajectory 870. At this point, trajectory 870 is a current trajectory having a first portion 880 to control the vehicle to a destination and a second portion 890 to control the vehicle to pull over and stop in the event the planner system 168 does not provide a new trajectory.

For instance as noted above, the computing devices 110 may control the vehicle to follow the trajectory 870 by sending commands to control the actuators of the declaration system 160, acceleration system 162, steering system 164, and/or power system 174. As such, the vehicle 100 will proceed along the current trajectory, following at least the first portion of the current trajectory, such as first portion 880, until a new trajectory is received from the planner system 168. Typically, a new trajectory would be generated, received by the computing devices 110, and acted upon prior to the start of the second portion of a current trajectory, such as second portion 890. If not, the computing devices 110 will continue to control the vehicle in order to follow the second portion of the trajectory and cause the vehicle to pull over, stop, etc., without interruption in the vehicle operation from first portion 880 to second portion 890.

In some instances, the computing devices 610 of the planner system 168 may generate an error message for an error which causes the planner system to be unable to generate a new trajectory. In other instances, the computing devices 610 may successfully generate a trajectory, but that trajectory may be output with or otherwise associated with an error message generated by the computing devices 610. In such cases, the trajectory may be discarded, that is not actually sent to the computing devices 110, in order to ensure that the computing devices 110 do not try to control a vehicle using a trajectory which may be "affected by an error. Each error message may include an identifier as well as a descriptor identifying a type of the error.

The computing devices 610 may determine whether the error message, or rather the type of error, is recoverable or a recoverable error as shown in block 724. This may include retrieving and searching a recoverable error list from the memory of the computing devices of the planner system 168 to determine whether the type of error of the received error message is included in the recoverable error list. In this regard, the recoverable error list may identify certain types of errors and whether or not they are considered to be recoverable, such as running out of time to compute a new trajectory, an inability to find a valid geometry for a trajectory due to a momentary perception error, etc. In some instances, when the type of error is included in the recoverable error list, the computing devices 610 of the planner system 168 may also resend the last trajectory sent to the computing devices 110. However, because the computing devices 110 are already following that trajectory, no time is lost as the vehicle will seamlessly continue to be controlled in order to stop, pull over, etc.

When the type of error is not included in the recoverable error list, the planner system 168 may shut itself down or rather, power down, and/or otherwise be prevented from attempting to generate new trajectories. At the same time, the computing devices 110 will cause the vehicle to follow the second portion of the trajectory and stop, pull over, etc.

Once the planner system 168 is shut down, it may remain so until it has been reset. For instance, the vehicle 100 may need to be completely powered down and restarted in order to reboot all of the various systems of the vehicle, including the planner system 168 or the planner system 168 may simply need to be reset. This may be performed locally automatically after some period of time, for instance, by a command, for instance via a command message 640, from the computing devices 110 and/or a human operator at the vehicle.

As another instance, when the planner system 168 is going to shut down and/or is otherwise prevented from attempting to generate new trajectories, the planner system and/or the computing devices 110 may also send a notification via network 460 to a remote operator, such as user 442 operating work station 440. The user 442 may be able to use the work station 440 to review the error, including the error type, and determine whether it is safe to reset the planner system, with or without causing the vehicle to completely power down.

In addition, because the recoverable error list includes only recoverable errors, previously unidentified errors are automatically assumed to be not recoverable. In this regard, shutting down and resetting the planner system 168 may be used a default for all unidentified errors or errors identified as not recoverable on the recoverable error list. This prevents the computing devices 110 from continuing to wait for the planner system 168 to provide a new trajectory when it is not safe or helpful to do so.

When the type of error is included in the recoverable error list, rather than being shut down and/or otherwise prevented from attempting to generate new trajectories, the planner system 168 may attempt to generate a new trajectory as shown in block 726 of FIG. 7. For instance, the planner system 168 may be given an opportunity to generate a new trajectory, without first being shut down and reset. This may involve just waiting for the computing devices 610 of the planner system 168. In addition, the computing devices 110 will cause the vehicle to continue to follow the current trajectory, and will continue to wait for the planner system to send a new trajectory.

The moment the planner system is successful generating a new trajectory, this new trajectory may be sent to the computing devices 110. The computing devices 110 may then use the new trajectory, now the current trajectory, to control the vehicle as shown in block 730 of FIG. 7 and as discussed above.

In order to avoid the planner system generating a new trajectory in circumstances where there is some other problem with the planner system, limits may be placed on the planner system's ability to recover. These limits may be enforced by the computing devices 610 of the planning system. In this regard, any errors generated by the planning system 168 need not be published outside of the planning system unnecessarily.

For instance, if an error continues to be generated, but the planner system 168 is still generating new trajectories, there may be some problem with the planner system that is not readily apparent from the errors themselves. In such cases, continuing to allow the planner system 168 to generate such errors and also generate new trajectories may actually be unsafe. In this regard, as noted above, limits may be placed on the planner system's ability to continue to attempt to generate new trajectories when the planner system is also continuing to generate errors, even where those errors are recoverable. If any of these limits are met, the vehicle may be controlled by the computing devices 110 in order to pull over to a safe location within some predetermined period of time, for instance, within the next 10 minutes or more or less.

As one instance, a timer may be used to limit the amount of time that the planner system has to recover after a single recoverable error and generate a new trajectory. As an example, the timer may be set for a period of 10 seconds or more or less. Once an error is received from the planner system 168 and/or determined to be recoverable, the computing devices 110 may start the timer. If the planner system 168 is not able to generate a new trajectory before the timer expires or rather, if a new trajectory is not sent to the computing devices 110 before the timer expires, the planner system 168 may shut itself down and/or otherwise be prevented from attempting to generate new trajectories (in some instances, after resending the last trajectory), and the vehicle is controlled by the computing devices 110 to pull over, stop, etc. according to the last received trajectory as described above, whether or not the errors were recoverable errors.

In addition or alternatively, maximum counts or sums maybe placed on the number of recoverable errors. In this regard, the planner system 168 may be allowed no more than a maximum number of errors of a particular type or of all types within a predetermined period of time. In other words, the planner system 168 may be limited to a maximum count of errors R within a predetermined amount of time S. As one example, the maximum count of errors R may be 3 errors (or more or less) of the same or of different types, and the predetermined amount of time S may be 2 minutes (or more or less). In addition, the maximum count of errors R may represent all types of recoverable errors or only a single type of recoverable error. In this regard, the computing devices 610 may keep a tally or count of the count of errors and/or the count of errors of each type. The computing devices 110 may then determine whether the maximum count of errors R has been met over or within the predetermined amount of time S. If the maximum count of errors R has been met over or within a predetermined amount of time S, the planner system 168 may shut itself down and/or otherwise be prevented from attempting to generate new trajectories (in some instances, after resending the last trajectory), and the vehicle may be controlled by the computing devices in order to pull over, stop, etc. according to the last received trajectory as described above, whether or not the errors were recoverable errors.

In addition or alternatively, the planner system may be allowed no more than a maximum count of errors T of all types and/or of a certain type during a trip. One type of trip (e.g. a transport trip) may include the vehicle's travel between an initial location, for instance where the vehicle 100 stops to pick up passengers and/or cargo, and a destination, for instance where the vehicle stops to drop off passengers and/or cargo. Another type of trip (e.g. an empty trip) may include the vehicle's travel between an initial location, for instance where the vehicle 100 stops to drop off passengers and/or cargo, and a destination, for instance, where the vehicle stops to pick up passengers and/or cargo. As an example, the maximum count of errors T may include 10 errors of the same or any type of error during a trip. Again, in this regard, the computing devices 610 may keep a tally or count of the count of errors and/or the count of errors of each type. The computing devices 610 may then determine whether the maximum count of errors T has been met during a trip. If so, the the planner system 168 may shut down and/or be otherwise prevented from attempting to generate new trajectories (in some instances, after resending the last trajectory), and the vehicle may be controlled in order to pull over, stop, etc. according to the last received trajectory as described above, whether or not the errors were recoverable errors.

In addition or alternatively, the planner system 168 may be limited in the cumulative amount of recovery time that the planner system has to generate new trajectories during a given period of time. For instance, the computing devices 610 may track the amount of time between receiving a recoverable error and receiving a new trajectory. This time may be accumulated. The computing devices 610 may then determine whether this accumulated value meets a maximum cumulative amount of recovery time X during or over a predetermined period of time Y. As an example, the maximum cumulative amount of receiver time X may be 12 seconds or more or less and the predetermined period of time Y may be 2 minutes or more or less or an entire trip. If so, the planner system 168 may shut itself down and/or otherwise prevented from attempting to generate new trajectories (in some instances, after resending the last trajectory), and the vehicle may be controlled in order to pull over, stop, etc. according to the last received trajectory as described above, whether or not the errors were recoverable errors.

The features described herein may allow the vehicle to respond to certain types of issues with the vehicle's systems, "gracefully" rather than attempting to stop the vehicle immediately and/or stranding the vehicle, for example, when the vehicle's computing devices are overheating. Although the vehicle may be driven without a new trajectory for some brief period of time after an error, because the use of the second portion of a trajectory which provides a fallback solution (i.e. stop or pull over) can ensure the safety of the vehicle while providing the planner system with the ability to attempt to recover from the error. In this regard, the vehicle is able to attempt for a better outcome after an error while still preparing to stop the vehicle safely. As such, if the planner system is unable to recover, the vehicle is already stopped or on its way to stopping safely.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a vehicle in an autonomous driving mode using trajectories, the method comprising:
  receiving, by one or more first computing devices, a trajectory from one or more second computing devices of a planner system of the vehicle;
  while the one or more first computing devices are controlling a vehicle in the autonomous driving mode based on the trajectory:
    generating, by the one or more second computing devices, an error,
    determining, by the one or more second computing devices, whether the error is a recoverable error, and
    when the error is determined to be a recoverable error, attempting, by the one or more second computing devices, to generate a new trajectory; and
  when the one or more second computing devices generate the new trajectory, controlling, by the one or more first computing devices, the vehicle according to the new trajectory.

2. The method of claim 1, wherein determining whether the error is a recoverable error includes looking up a type of the error in an error list identifying recoverable errors.

3. The method of claim 1, further comprising, using a timer to limit an amount of time that the one or more second computing devices has to generate the new trajectory, such that when the timer expires before the new trajectory is generated, shutting down the planner system.

4. The method of claim 1, further comprising, after controlling the vehicle according to the new trajectory:
  generating, by the one or more second computing devices, a second error;
  determining, by the one or more second computing devices, whether the one or more second computing devices has met a maximum count of errors based on the error and the second error; and
  controlling the vehicle according to the determination of whether the planner system has met the maximum count of errors.

5. The method of claim 4, wherein when the one or more second computing devices has met the maximum count of errors, controlling the vehicle according to the determination of whether the planner system has met the maximum count of errors includes controlling the vehicle in order to pull over the vehicle within a predetermined period of time.

6. The method of claim 4, wherein determining whether the one or more second computing devices has met the maximum count of errors includes determining whether the one or more second computing devices has met the maximum count of errors over a predetermined period of time.

7. The method of claim 4, wherein determining whether the one or more second computing devices has met the maximum count of errors includes determining whether the one or more second computing devices has met the maximum count of errors over a trip from an initial location to a destination.

8. The method of claim 4, wherein determining whether the one or more second computing devices has met the maximum count of errors includes determining whether the one or more second computing devices has met the maximum count of errors for a given type of error.

9. The method of claim 4, wherein determining whether the one or more second computing devices has met the maximum count of errors includes determining whether the one or more second computing devices has met the maximum count of errors for all types of errors generated by the one or more second computing devices.

10. The method of claim 1, further comprising, after controlling the vehicle according to the new trajectory:
  generating, by the one or more second computing devices, a second error;
  determining, by the one or more second computing devices, whether the one or more second computing devices has met a maximum cumulative amount of recovery time attempting to recover from errors during a given trip; and
  controlling the vehicle according to the determination of whether the one or more second computing devices has met the maximum cumulative amount of recovery time.

11. The method of claim 10, wherein when the one or more second computing devices has met the maximum count of errors, controlling, by the one or more first computing devices, the vehicle in order to pull over the vehicle within a predetermined period of time.

12. The method of claim 10, wherein determining whether the one or more second computing devices has met the maximum count of errors includes determining whether the one or more second computing devices has met the maximum cumulative amount of recovery time over a predetermined period of time.

13. A method of controlling a vehicle in an autonomous driving mode using trajectories, the method comprising:
  receiving, by one or more first computing devices, a trajectory from one or more second computing devices of a planner system of the vehicle; and
  while the one or more first computing devices are controlling a vehicle in the autonomous driving mode based on the trajectory:
  generating, by the one or more second computing devices, an error,
  determining, by the one or more second computing devices, whether the error is a recoverable error, and
  when the error is determined not to be a recoverable error, shutting down the one or more second computing devices down and controlling, by the one or more first computing devices, the vehicle according to a last received trajectory.

14. The method of claim 13, wherein when the error is not included in the error list, using a default rule to determine that the error is a non-recoverable error.

15. The method of claim 13, wherein controlling the vehicle according to the last received trajectory includes following a second portion of the last received trajectory in order to stop the vehicle.

16. A system for controlling a vehicle in an autonomous driving mode using trajectories, the system comprising:
one or more first computing devices configured to:
receive a trajectory from one or more second computing devices; and
control the vehicle in the autonomous driving mode based on the trajectory, and
when one or more second computing devices generates a new trajectory, control, by the one or more first computing devices, the vehicle according to the new trajectory; and
one or more second computing devices configured to, while the one or more first computing devices is controlling the vehicle in the autonomous driving mode based on the trajectory:
generate an error,
determine, by the one or more second computing devices, whether the error is a recoverable error, and
when the error is determined to be a recoverable error, attempting to generate the new trajectory.

17. The system of claim 16, further comprising the vehicle.

18. The system of claim 16, wherein the one or more second computing devices are further configured to determine whether the error is a recoverable error by looking up a type of the error in an error list identifying recoverable errors.

19. The system of claim 16, wherein the one or more second computing devices are further configured to, generate a second error and determine whether the one or more second computing devices has met a maximum count of errors based on the error and the second error.

20. The system of claim 19, wherein the one or more second computing devices are further configured to stop attempting to generate new trajectories when the second computing devices are determined to have met the maximum count of errors.

* * * * *